United States Patent [19]
Faulkner

[11] Patent Number: 5,293,168
[45] Date of Patent: Mar. 8, 1994

[54] RADAR APPARATUS AND METHOD

[75] Inventor: Alistair R. Faulkner, Essex, United Kingdom

[73] Assignee: GEC-Marconi Limited, Middlesex, United Kingdom

[21] Appl. No.: 9,478

[22] Filed: Jan. 29, 1993

[30] Foreign Application Priority Data

Mar. 6, 1992 [GB] United Kingdom ................. 9204866

[51] Int. Cl.⁵ ...................... G01S 13/28; G01S 13/38
[52] U.S. Cl. ................................. 342/145; 342/189; 342/130; 342/136
[58] Field of Search ............... 342/189, 130, 131, 132, 342/134, 135, 136, 145, 200

[56] References Cited

U.S. PATENT DOCUMENTS

| | | | |
|---|---|---|---|
| 3,555,258 | 1/1971 | Berthier et al. | 364/824 |
| 3,796,868 | 3/1974 | Kaul et al. | 375/116 X |
| 3,829,860 | 8/1974 | Cutler et al. | 342/110 |
| 4,234,883 | 11/1980 | Kaelin et al. | 342/391 |
| 4,278,978 | 7/1981 | Easterling et al. | 342/383 |
| 4,293,856 | 10/1981 | Chressanthis et al. | 342/93 |
| 4,813,006 | 3/1989 | Burns et al. | 342/189 |

*Primary Examiner*—John B. Sotomayor
*Attorney, Agent, or Firm*—Lowe, Price, LeBlanc & Becker

[57] ABSTRACT

The invention provides a method of determining the range of a radar signal reflecting object by utilizing a radar frequency carrier wave modulated by a first short code having a first repetition rate and a second code having a bit rate equal to the first code repetition rate. A received echo is first passed to an analogue correlator for correlation against a delayed version of the first code, and the output of the analogue correlator is fed to a digital correlator for correlation therein against the second code. In this way, the high bandwidth (greater range resolution) of analogue correlation can be combined with the lower bandwidth (longer ambiguity function) of digital correlation to provide high resolution target detection without ambiguity and at a fast rate without the need for a very large number of correlators.

17 Claims, 3 Drawing Sheets

RADAR APPARATUS AND METHOD

FIELD OF THE INVENTION

This invention concerns radar, particularly, but not exclusively, the detection of radar signal reflecting objects and the identification of the range or of the range and bearings of such objects from a radar platform.

BACKGROUND OF THE INVENTION

As is well known, the range of a radar echo producing object can be determined by the elapsed time between propagation of a radar signal and receipt of an echo. The distance travelled by the radar signal, twice the range of the echo producing object is determined by multiplying C, the speed of light, by the elapsed time. A radar beam, with no beam spread, will provide a unique identification of the location of the echo producing object by the elapsed time and by the beam direction. However, radar beams have a beam width in both azimuth and elevation and unless the echo signal is time differentiated, an object which produced the echo may be located anywhere within the footprint of the beam. Time differentiation may be effected in many ways. The simplest, a single pulse, will indicate, by the elapsed time to detection of the echo, that an echo producing object lies on an annulus of radius centred on the radar platform wherefrom the radar signal is propagated but of arc length extending from edge to edge of the beam footprint. If the pulse is repeated, an ambiguity function arises in that a received echo may be caused by reflection of the first pulse from a more distant object or the reflection of the second pulse from a nearer object. The ambiguity function is related to the pulse repetition rate.

If the radar signal is propagated as a continuous wave, then it is conventional to modulate a radar frequency carrier wave with an identifiable modulation to form the radar signal. The identifiable modulation may take the form of a code. The elapsed time to receipt of the code is indicative of a range cell wherein the reflecting object lies. Repetition of the code introduces an ambiguity function which is related to the code repetition rate and, again, each range cell is part annular in shape. Thus, the ambiguity function defines range bands, each band comprising a plurality of range cells. An individual range cell may be identified by correlation as hereinafter described. If the range band is wide enough (e.g. equal to the distance between minimum and maximum desired ranges) then there will only be one correlating range cell and the location of the echo producing object (as far as range is concerned) is uniquely identified. If the range band is narrow, that is much less than the desired search range. Correlation by code will indicate that an echo producing object lies within a particular range cell of a range band, e.g. the nth cell, but not the range band in which that cell lies. Other means are then necessary to resolve the ambiguity function to determine in which range band the range cell lies. Using an n-bit code, n range cells can be identified within a range band, each range band being of width equal to the distance travelled by the radar signal during the propagation period p of the n-bit code and each range cell is of radial width equal to the distance travelled by the radar signal during each bit period that is during the time $p/n$ seconds.

Correlation is effected by comparing the modulation of a received echo with the modulation applied to the propagated signal delayed by a sequence of predetermined intervals, the predetermined intervals being of duration $p/n$. Thus, the propagated signal may be tapped and delayed by a preset delay and fed to a correlator whereto an amplified received echo is also fed.

Positive correlation indicates that a radar signal reflecting object lies within that range cell corresponding to the preset delay. The range cell is of course one of a plurality of range cells repeated at the ambiguity function distance i.e. the reflecting object lies in one of the repetitive range cells associated with the successful correlation. The interval between the preset delays is arranged to be equal to the bit length of the code ($p/n$). As aforesaid, such an interval determines the radial width of each range cell. The code length p provides a minimum required integration period of the apparatus.

Both analogue and digital correlators are known. Analogue correlation is used in Signature Measurement and Analysis (SMA) high range resolution radars. Analogue correlation has the advantage of ability to correlate wide bandwidth (for example, 1 GHz and above) signals. It has the disadvantage of requiring, for each range cell, a separate correlator. Thus, the hardware requirement may be described as massive. Further, the data gathering potential of analogue correlators is slow when compared with digital correlation (see below).

For example, at a modulation frequency of 1 GHz, each range cell (the range resolution) is only 0.15 meters in radial width. This is considerably better than is normally required. Using a 64 bit modulation code (reasonable for analogue correlation), the ambiguity function is, however, only 9.6 meters. A longer code would increase the ambiguity function but other measures are normally resorted to to resolve the ambiguity function.

FIG. 1 is a diagrammatic representation of analogue correlation. A carrier wave 1 of radar frequency is biphase modulated using a 64 bit maximal linear code 2 with a bit rate of 1 GHz. The received signals (echoes) are fed to an analogue correlator together with the 64 bit code to which is applied a stepwise variable time delay. For each time delay $T_R + t_n$ (where $T_R$ is a delay requisite to a minimum desired range and $t_n$ is the additional stepwise increment thereto between $t=0$ at $n=1$ to $t=64$ nano secsonds at $n=64$), the correlator mixes the applied signals. The output of the correlator includes an integrator or low pass filter 26. The output of the filter 26 is graphically illustrated at the bottom of FIG. 1 on the assumption that an echo occured when code input to the correlator was delayed by $T_R + t_1$ i.e. $T_R$ seconds. As stated above, the code input is delayed by a further nanosecond and fed to the correlator 22 again (or to a second similarly arranged analogue correlator) to determine if any signal reflecting object lies in the next repetitive 0.15 m range cells corresponding to a delay of $T_R + t_2$. Thus, the analogue correlator 22 is capable of reporting a reflecting object lying within a 0.15 m range cell but ambiguously. Other means are necessary to resolve the ambiguity. For each range cell in the range bands, a separate correlator can be used.

Digital correlation (known also as "compression" correlation) of digitally encoded propagated waveforms provides large quantities of range information very rapidly. However, digital correlation is limited in bandwidth (having a typical maximum between 10 MHz and 20 MHz) and its suitability in radar use is limited by the consequent poor range resolution and Doppler sidelobe performance.

For example, at a code bit rate of 10 MHz, the range resolution (the radial width of each range cell) is 15 meters. Coding the propagated wave with a 2048 bit code results in an ambiguity function of 30.72 Km. At a bit rate of 20 MHz, the resolution improves to 7.5 meters but the ambiguity function, for the same coding, drops to 15.36 Km. Whilst the higher ambiguity function is desirable, the range resolution even at 20 MHz is unsatisfactory.

It is an object of the present invention to provide a method of and an apparatus for determination of range of a radar echo producing object maximizing the advantages of both analogue and digital correlation whilst minimizing the disadvantages thereof.

SUMMARY OF THE INVENTION

According to the present invention, there is provided a method of determining the range of a radar signal reflecting object which method comprises the steps of generating a radar frequency carrier wave, modulating the carrier wave with a first code having a first bit rate and a first code repetition rate, modulating the carrier wave with a second code having a bit rate equal to and synchronous with the first code repetition rate, the modulated carrier wave being transmitted as a radar-signal, feeding a received echo to an analogue correlator whereto is also fed a delayed version of the first code, feeding the output of the analogue correlator via a down converter to a digital correlator for correlation therein with the second code, whereby a received echo correlated in the analogue correlator provides information as to a range cell wherein the reflecting object lies and correlation of the output of the analogue correlator in the digital correlator provides information as to a range band in which the range cell lies.

The invention also provides a radar apparatus comprising means for propagating a radar signal comprising a radar frequency carrier wave modulated by a first code having a first bit rate and a first repetition rate and a second code having a second bit rate equal to and synchronous with the first code repetition rate, means for receiving a radar signal echo and for feeding the echo to an analogue correlator, means for producing a delayed version of the first code and for feeding the same to the analogue correlator, a digital correlator whereto the output of the analogue correlator is fed after down conversion, and indicator means for indicating digital correlation of the analogue correlator output with the second code.

BRIEF DESCRIPTION OF THE DRAWINGS

The invention will be described further, by way of example, with reference to the accompanying drawings, in which.

DESCRIPTION OF THE INVENTION

Figure 1:
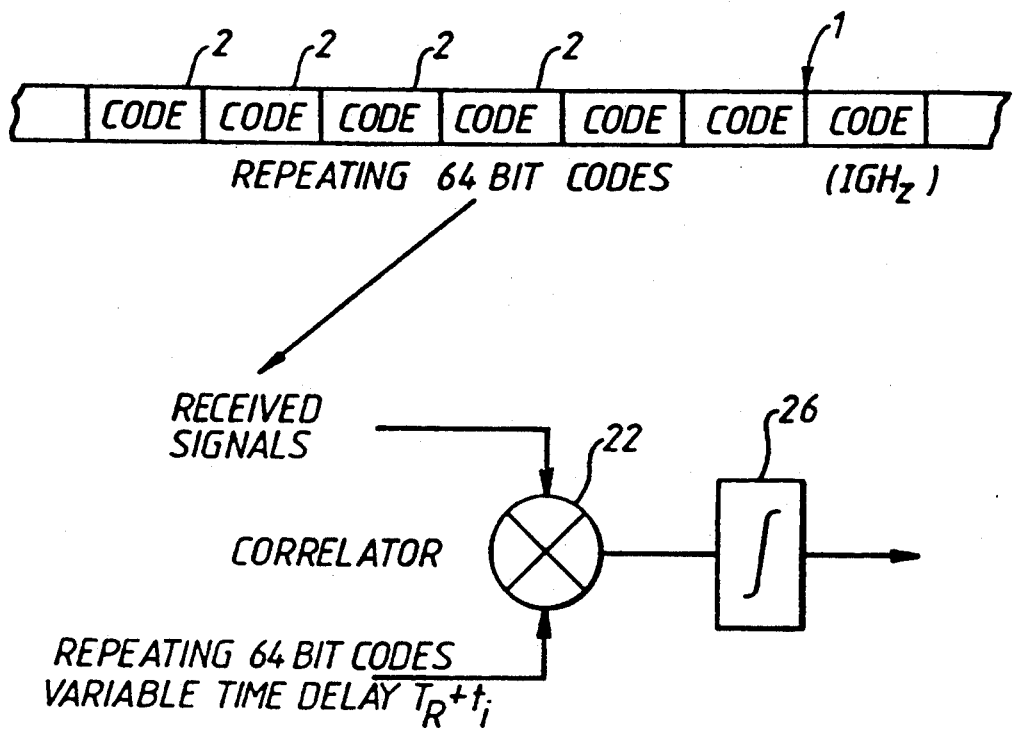
FIG. 1, as aforesaid, is a diagrammatic representation of a known form of analogue correlation.
Figure 1:
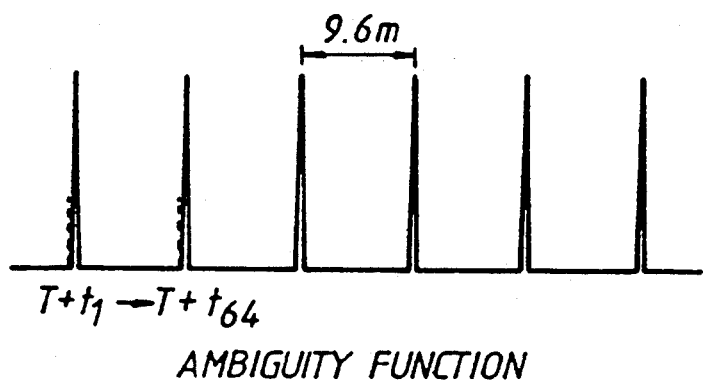
Figure 2:
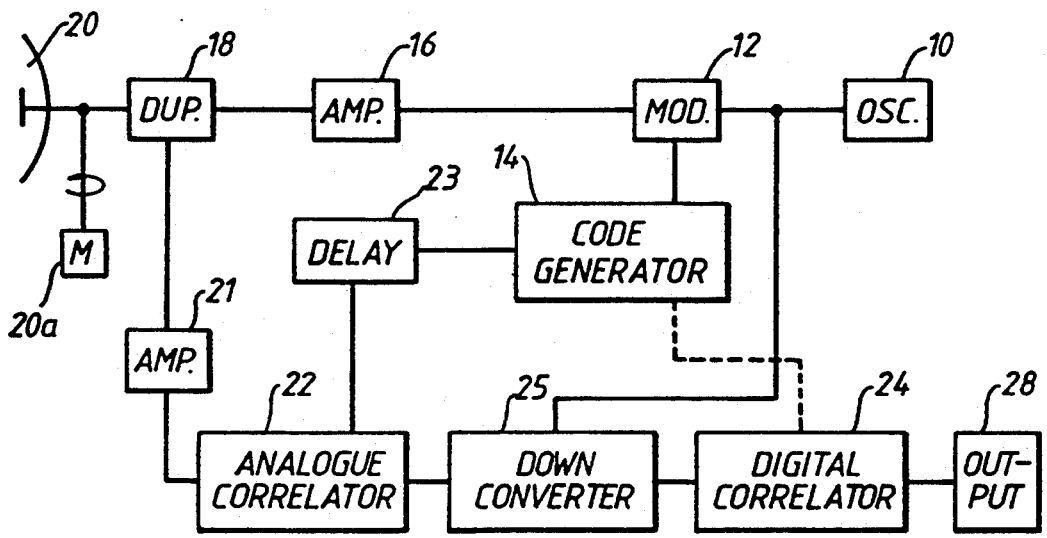
FIG. 2 is a simplified block diagram of radar apparatus for carrying out the present invention.
Figure 3:
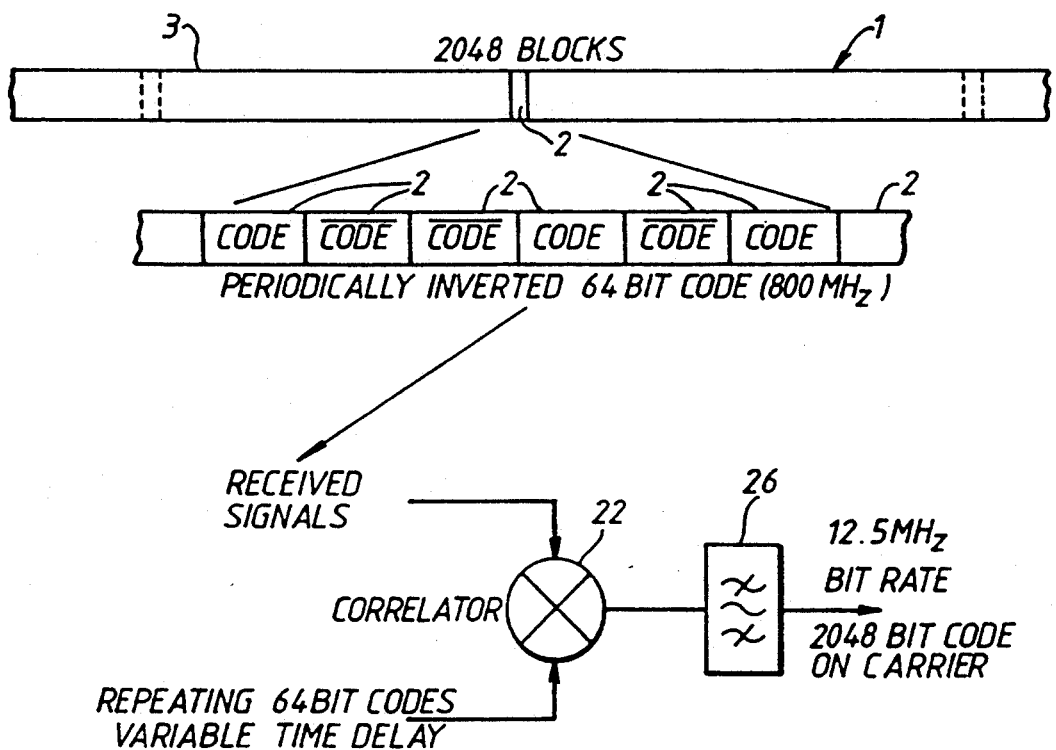
FIG. 3 is a diagram, similar to FIG. 1 but illustrating analogue correlation as effected in the method of the present invention.
Figure 4:
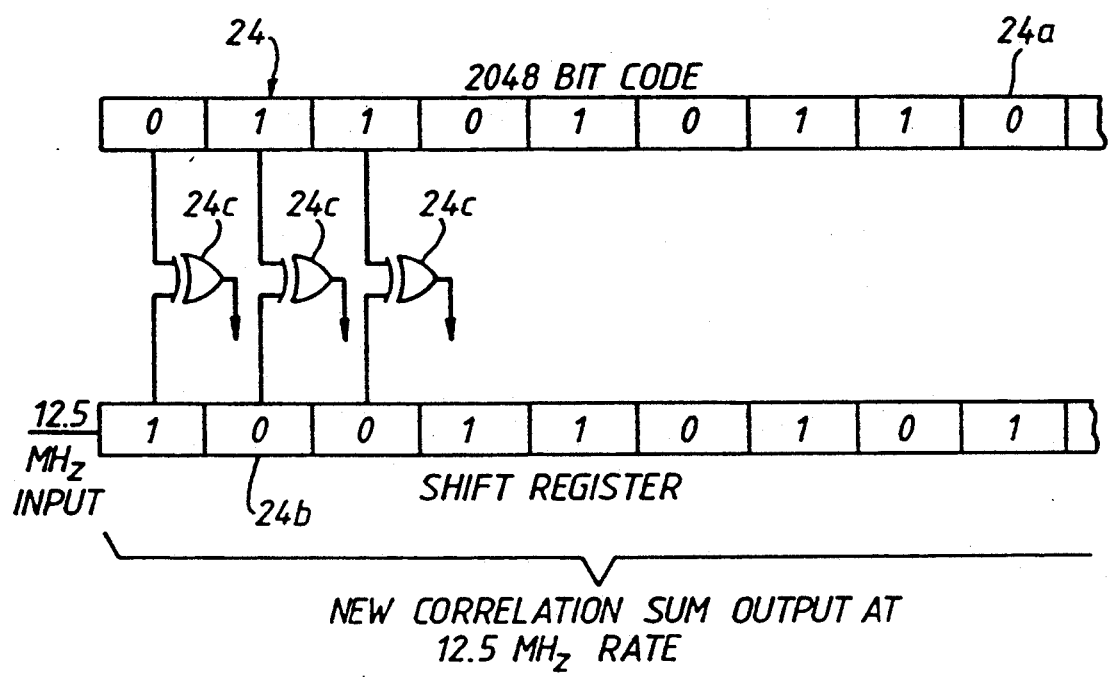
FIG. 4 is a diagrammatic representation of digital correlation forming a second step in carrying out the method of range determination in accordance with the present invention.

Referring now to FIGS. 2 to 4, there is shown an apparatus for determining the range of an echo producing object using radar. As shown in FIG. 2, a radar apparatus comprises an oscillator 10 operating at an RF frequency to generate a carrier wave. The output of the oscillator 10 is fed to a modulator 12 wherein the carrier wave of frequency, for example, in the range of 3–300 GHz, is biphase modulated by a repetitive first short code in the form of, for example, a 64 bit maximal linear code held in a code generator 14. The first code has a bit rate of, for example, 800 MHz and repeats at a frequency of 12.5 MHz. The code generator 14 also produces a second code 3 having a bit rate of 12.5 MHz i.e. synchronous with the first code repetition rate. The second code modulates (inverts) the first code in accordance with the binary state of the second code The second code has a typical length of 2048 bits.

The modulator 12 thus modulates the carrier wave in accordance with the first and second codes.

The modulated carrier wave is fed to an amplifier 16 and, after amplification, through a duplexer 18 to an antenna 20 (which may be scanned by a motor 20a) for propagation as a radar signal.

The duplexer 18 permits the antenna 20 to be used also for receiving echoes from radar reflecting objects. The received signal, the echo, is passed by the duplexer 18 to an amplifier 21 and then to an analogue correlator 22. The Code generator 14 also produces an output which is just the first code. A predetermined delay is applied to this code in delay unit 23 so that a delayed version thereof is also fed to the analogue correlator 22.

The predetermined delay may be constituted by a first delay $T_R$ corresponding to a minimum desired range of search ($T_R$ may be zero) and an increment $t_i$ of a series of incremental delays $t_0$ to $t_n$ ($n=64$ for a 64 bit first short code). It will be appreciated that due to the repetitive nature of the first code, the first delay $T_R$ is redundant and can be always set to zero.

The described modulated carrier wave enables discrimination of range cells 0.1875 m in radial width but, because of the length of the first short code, the ambiguity function is 12 m. If an echo is received from a reflecting object in any one of the range cells, correlation will occur between the received echo signal and a delayed version of the transmitted signal. However, if only the short code were employed with continuous wave propagation of the radar signal, for a range of say 24 Km, a total number of incremented delays 64 (or a total of 64 individually delayed correlators) would not identify, without ambiguity, which of two thousand range cells contained the reflecting object.

However, if the output of the analogue correlator 22 is fed to a digital correlator 24, via a down converter 23, the long digital code of the modulated carrier wave enables resolution of its 12 meter range cells with an ambiguity function of 24.36 Km.

Code correlation in a digital correlator is a simple operation. The code is stored in memory cells 24a. The output of the analogue correlator is clocked into memory cells 24b (see FIG. 4), the clocking rate being 12.5 MHz, the contents of each cell 24a is exclusive ORed or exclusive NORed with the content of the corresponding stage of the shift register 24b and the output of the exclusive OR or exclusive NOR gates 24c summed. If the sum is zero (exclusive OR gates) or 2048 (exclusive NOR gates), then digital correlation occurs. The step at which correlation occurs (at which the output 28 is zero or 2048) is indicative of which 12 meter range band (range cell as far as the long code is concerned) contains the reflecting object and its position within the now indicated 12 meter band is already established by the analogue correlator increment $t_i$.

In practice, the delay 24 imposes a first delay $T_R+t_i$, on the short code and the code generator 14 feeds the long code to the analogue correlator 22 whereto a received echo is also fed. Correlation will only occur if the received echo emanated from a reflecting object lying within one of the first 0.1875 range cells. After determination if correlation has occured, a delay of $T_R+t_2$ is applied to the short code and analogue correlation is again attempted. As there are 64 range cells within each 12 meter band (the ambiguity function), the foregoing steps are repeated incrementing the delay up to a maximum of $T_R+t_{64}$. An inherent integration period of 164 us (the length of the second code) is provided. All 64 range cells can then be considered in a period of some 10 ms. This is well within the dwell period of a scanning antenna.

A range cell of size 0.1875 m is extremely small: smaller than is normally required. The bit rate of the first code may be reduced or, alternatively, a plurality of analogue correlators may be used in parallel, each having a further incremented delay $t_i$ applied thereto. Thus, 8 analogue correlators 22 may be used in parallel fed with respectively delayed versions of the short code each incremented, for example by t and giving rise to analysis of range cells associated with delays $t_1$ to $t_8$. The analogue correlation of such a plurality of analogue correlators, whose outputs may be added together, provides range cells of width 1.5 meters and only 8 further stepwise correlations are necessary for analogue correlation of all the 12 meter bands.

I claim:

1. A method of determining the range of a radar signal reflecting object which method comprises the steps of generating a radar frequency carrier wave,
   (1) modulating said carrier wave with a first code having a first bit rate and a first code repetition rate,
   (2) modulating said carrier wave with a second code having a bit rate equal to and synchronous with said first code repetition rate,
   (3) transmitting said modulated carrier wave as a radar signal,
   (4) feeding a received echo to an analogue correlator whereto is also fed a delayed version of said first code,
   (5) and feeding an output of said analogue correlator via a down converter to a digital correlator for correlation therein with said second code,
   whereby a received echo correlated in said analogue correlator provides information as to a range cell wherein the reflecting object lies and correlation of the output of the analogue correlator in the digital correlator provides information as to a range band in which the range cell lies.

2. A method according to claim 1 wherein the bit rate of said first code is chosen to be equal to a desired range resolution.

3. A method according to claim 1 wherein said second code has a repetition rate such as to provide an ambiguity function not less than a desired maximum detection range.

4. A method according to claim 1 wherein said radio frequency carrier wave has a frequency in the range 3-300 GHz.

5. A method according to claim 1 wherein said first bit rate has a frequency in the range of 200 MHz to 1 GHz.

6. A method according to claim 1 wherein said first code is a 64 bit code and said first code repetition rate is 12.5 MHz.

7. A method according to claim 1 wherein said second code is a binary code of length 2048 bits.

8. A method according to claim 1 wherein both said first and second codes are binary and serve to biphase modulate said carrier wave.

9. A method according to claim 1 wherein said step of feeding a received echo to an analogue correlator takes place concurrently with the sequential feeding of a plurality of respectively delayed versions of said first code.

10. A method according to claim 1 including feeding a received echo to a plurality of said analogue correlators whereto are simultaneously fed respective delayed versions of said first code, each said analogue correlator providing an output in response to the echo only if a radar signal reflecting object which produced the echo lies in a range cell corresponding to the respective delay.

11. A method according to claim 10 wherein the respective delays are indicative of adjacent range cells and the outputs of said analogue correlators are added together before effecting digital correlation.

12. A radar apparatus comprising
   (1) means for propagating a radar signal comprising a radar frequency carrier wave modulated by a first code having a first bit rate and a first repetition rate and a second code having a second bit rate equal to and synchronous with said first code repetition rate,
   (2) means for receiving a radar signal echo and for feeding the echo to an analogue correlator,
   (3) means for feeding a delayed version of said propagated radar signal to said analogue correlator,
   (4) a digital correlator whereto an output of the analogue correlator is fed, and
   (5) indicator means for indicating digital correlation of the analogue correlator output with the second code.

13. An apparatus according to claim 12 wherein said propagating means comprises a radar frequency oscillator, code generating means for generating said first and second codes, modulator means for modulating the output of the oscillator with said codes and a radar antenna for propagating said modulated radar signal.

14. An apparatus according to claim 12 wherein said analogue correlator includes a band pass filter for filtering the correlator output, and said digital correlator comprises a shift register clocked at the first code repetition rate and holding a stored version of the second code.

15. An apparatus according to claim 14 wherein each bit of the stored second code is compared with a bit of a respective cell of said shift register, comparison outputs being summed to indicate digital correlation of the analogue correlator output with the stored second code.

16. An apparatus according to claim 12 wherein a plurality of said analogue correlators are provided whereto a received echo and respective delayed versions of the first code are fed, the outputs of said analogue correlators being fed for digital correlation.

17. An apparatus according to claim 16 including means for adding the outputs of the analogue correlators and for feeding the summed output to said digital correlator.

* * * * *